Aug. 4, 1931.  G. H. GREIMAN  1,817,367
TRENCH TRACTOR
Filed Sept. 6, 1928  7 Sheets-Sheet 2
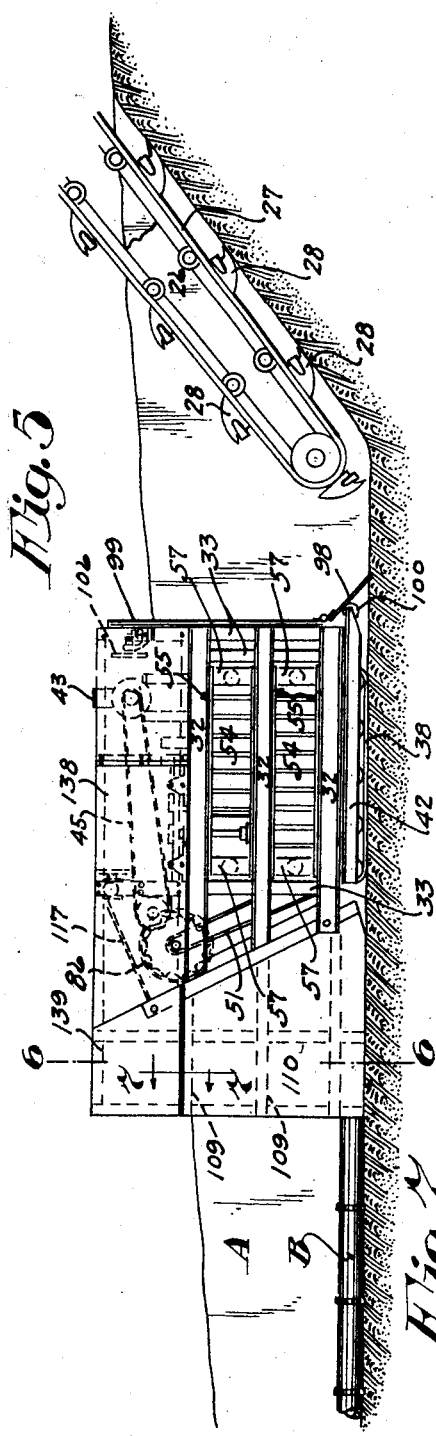
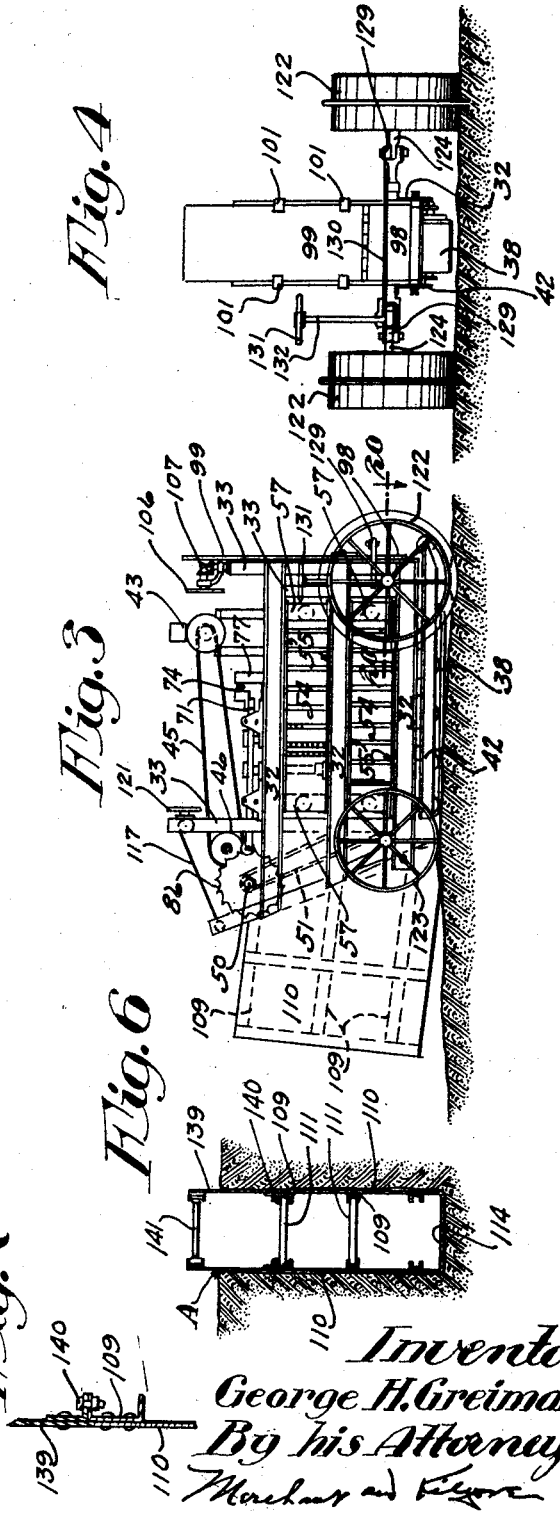
Inventor
George H. Greiman
By his Attorneys

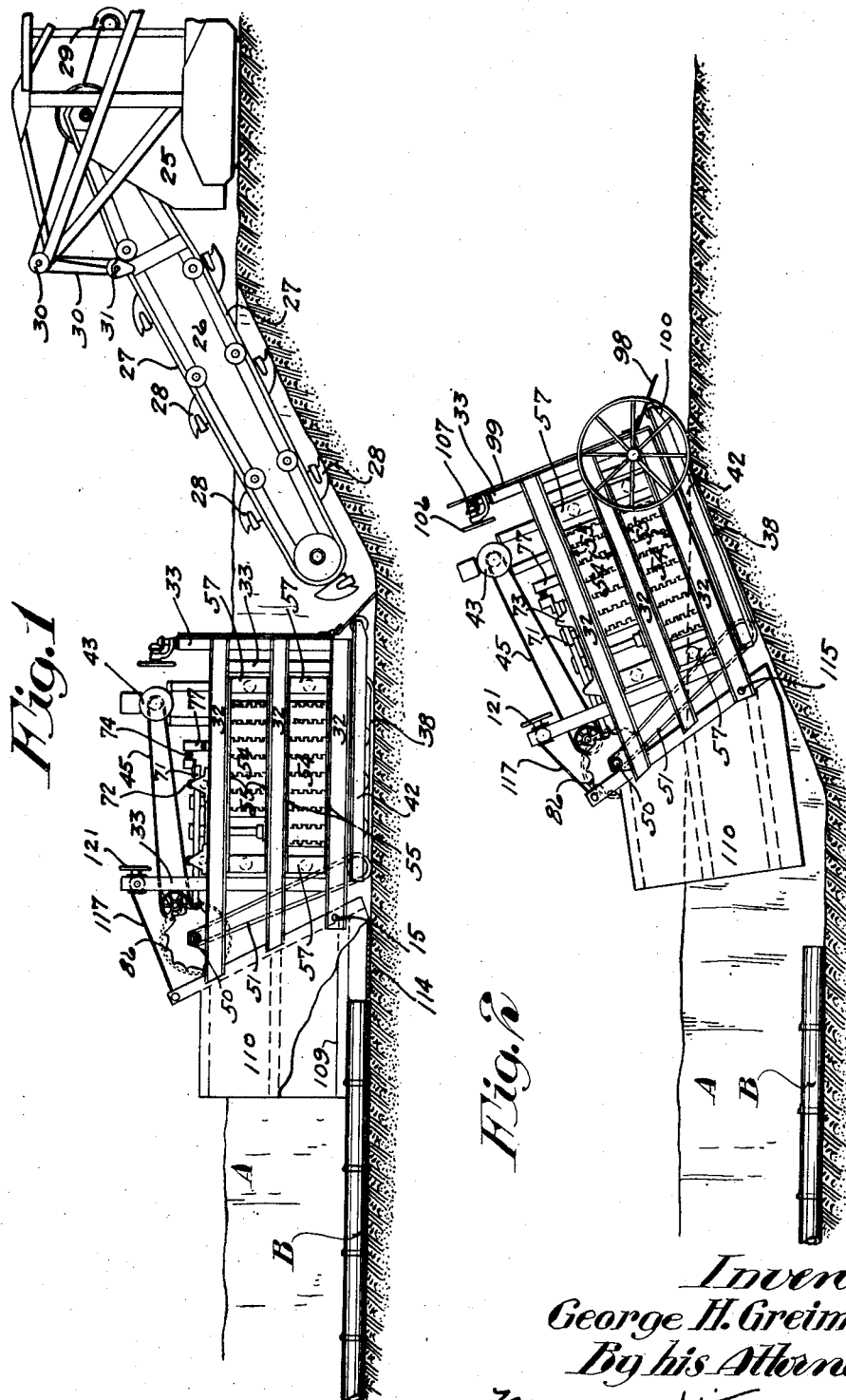

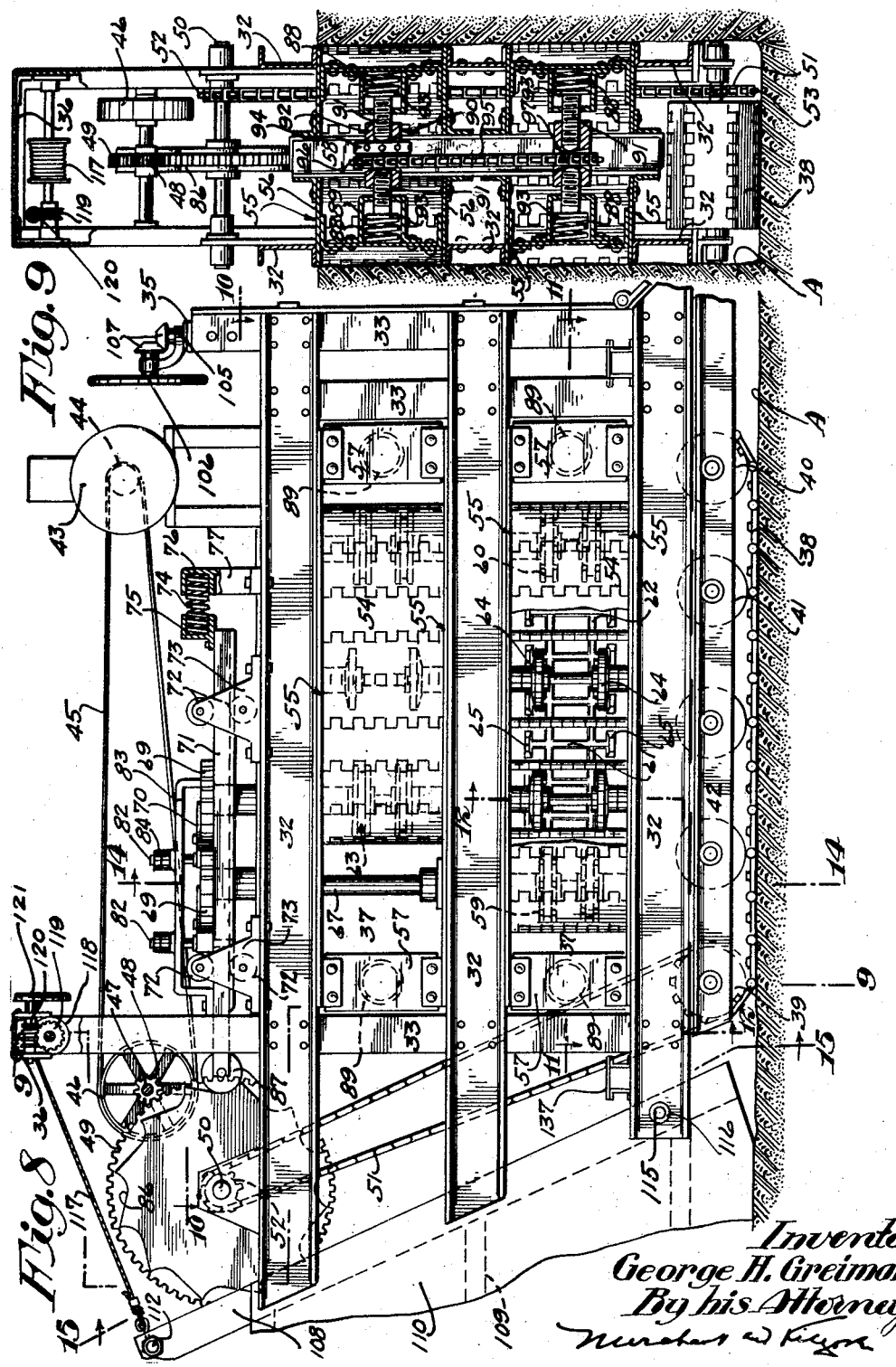

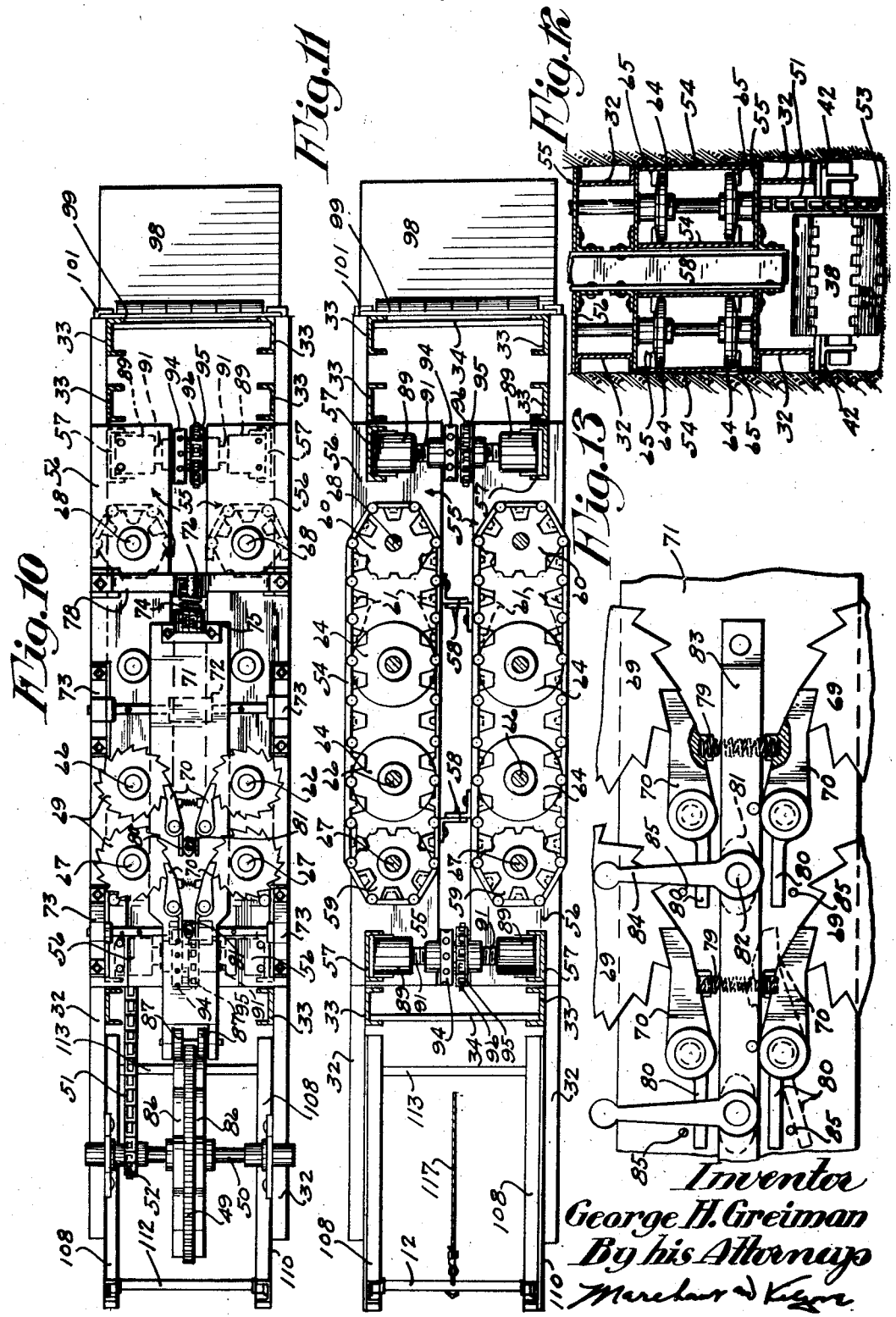

Aug. 4, 1931.  G. H. GREIMAN  1,817,367
TRENCH TRACTOR
Filed Sept. 6, 1928   7 Sheets-Sheet 5
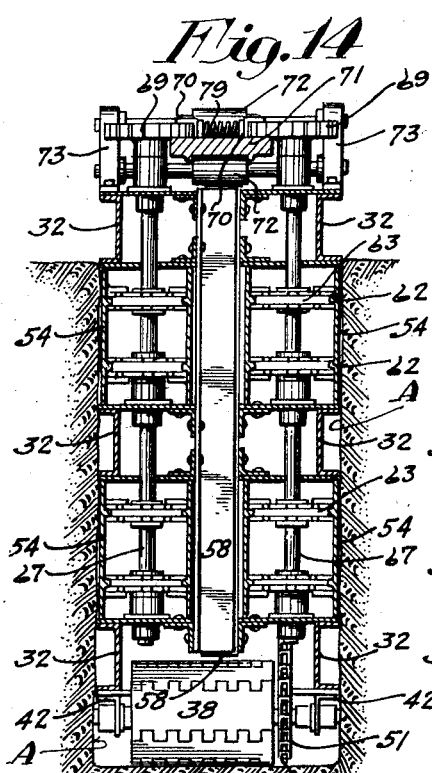
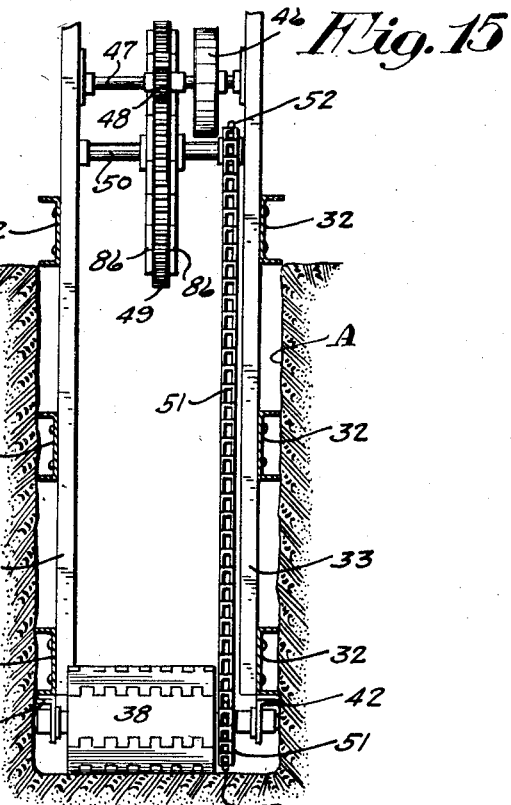
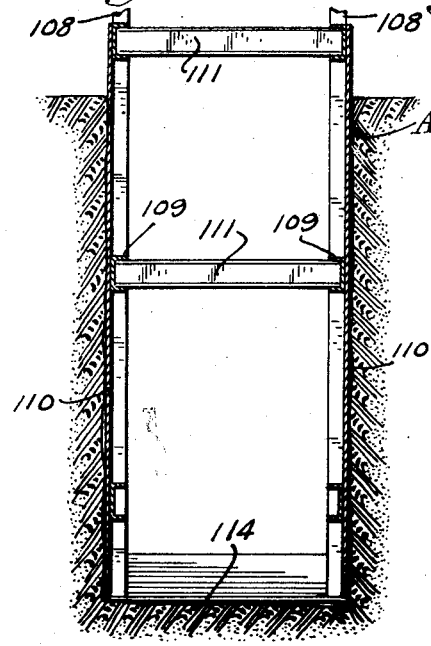
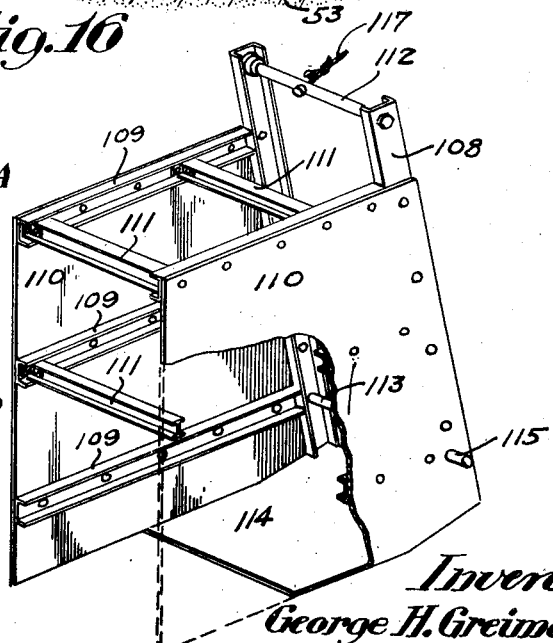
Inventor
George H. Greiman
By his Attorneys Aug. 4, 1931.  G. H. GREIMAN  1,817,367
TRENCH TRACTOR
Filed Sept. 6, 1928  7 Sheets-Sheet 6
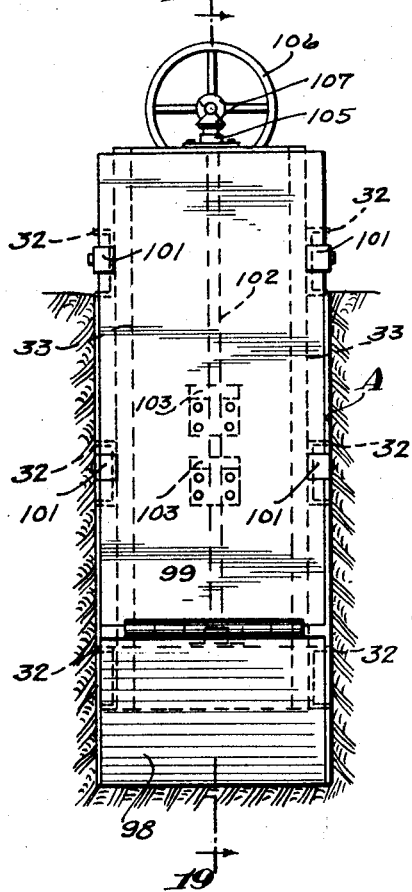
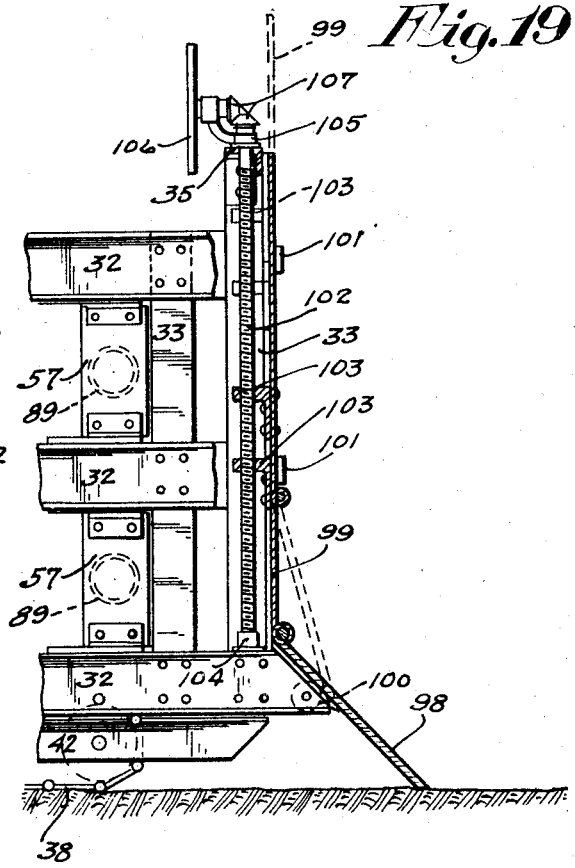
Inventor
George H. Greiman
By his Attorneys Aug. 4, 1931. G. H. GREIMAN 1,817,367
TRENCH TRACTOR
Filed Sept. 6, 1928 7 Sheets-Sheet 7
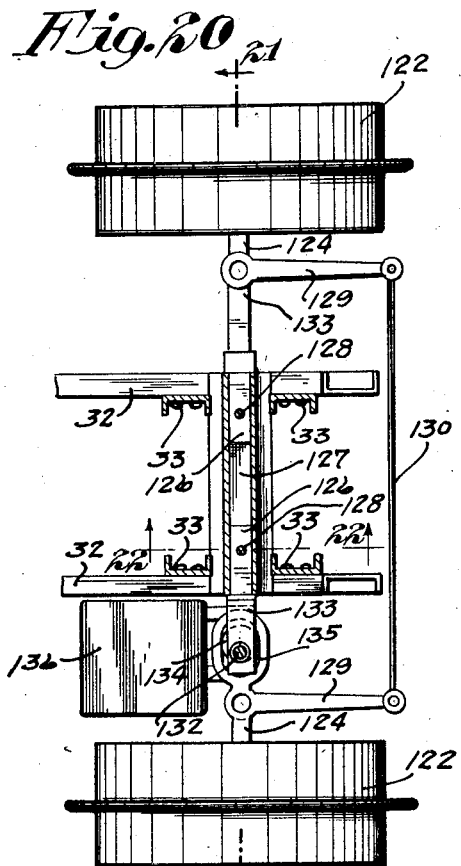
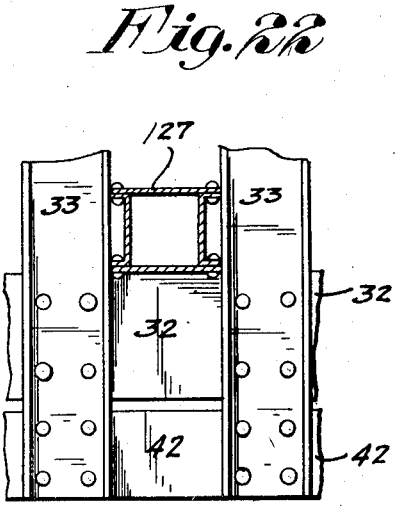
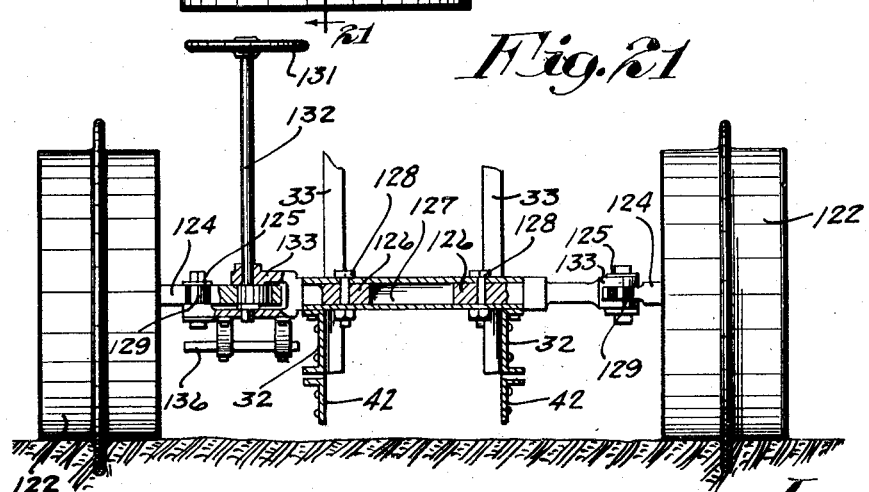
Inventor
George H. Greiman
By his Attorneys Patented Aug. 4, 1931

1,817,367

UNITED STATES PATENT OFFICE

GEORGE H. GREIMAN, OF GARNER, IOWA

TRENCH TRACTOR

Application filed September 6, 1928. Serial No. 304,287.

My present invention has for its object the provision of a self-propelled trench tractor adapted to travel in a trench and follow a trenching or excavating machine to act as sheathing to hold up the walls of the trench as it is dug by said machine, and in which trench is to be laid sewer, water, gas or other pipes or conduits.

In the preferred form of the trench tractor, it is designed to draw thereafter a sheathing device to hold up the walls of a trench back of the tractor where the workmen are laying a pipe or pipe sections in the trench to prevent the walls of the trench from caving in on the workmen and their work.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a view diagrammatically illustrating a trenching machine in the process of digging a trench and further illustrating the trench tractor following the trenching machine in the trench and drawing a sheathing device;

Fig. 2 is a view corresponding to Fig. 1 with the exception that the trenching machine is removed and the trench tractor, and sheathing device are shown moved partway out of the trench, and further illustrating a pair of front supporting and steering wheels applied to the tractor;

Fig. 3 is a view in side elevation diagrammatically illustrating the trench tractor and sheathing device as the same are transported from place to place;

Fig. 4 is a front end elevation of the parts shown in Fig. 3;

Fig. 5 is a view corresponding to Fig. 1 with the exception that the trench is shown extended into an elevation in the ground and further illustrating supplemental sheathing extensions on the trench tractor and sheathing device to hold the walls of the trench at their increased depth;

Fig. 6 is a view principally in transverse vertical section taken on the line 6—6 of Fig. 5;

Fig. 7 is a fragmentary detail view in section taken on the line 7—7 of Fig. 5, on an enlarged scale;

Fig. 8 is a fragmentary view principally in side elevation of the trench tractor and sheathing device, on an enlarged scale;

Fig 9 is a view partly in end elevation and partly in transverse vertical section taken on the irregular line 9—9 of Fig. 8;

Fig. 10 is a view principally in plan of the parts shown in Fig. 8, and with some parts sectioned on the line 10—10 of Fig. 8;

Fig. 11 is a view partly in plan and partly in horizontal section taken on the line 11—11 of Fig. 8;

Fig. 12 is a view partly in end elevation and partly in transverse vertical section taken on the irregular line 12—12 of Fig. 8;

Fig. 13 is a fragmentary detail view principally in plan, but with some parts broken away and sectioned, illustrating the pawl and ratchet driving mechanism for the wall retaining traction belts;

Fig. 14 is a view partly in end elevation and partly in section taken substantially on the line 14—14 of Fig. 8;

Fig. 15 is a view partly in elevation and partly in transverse vertical section taken on the irregular line 15—15 of Fig. 8;

Fig. 16 is a perspective view of the sheathing device with some parts broken away and sectioned;

Fig. 17 is a view principally in transverse vertical section showing the sheathing device in the trench;

Fig. 18 is a front end elevation of the trench tractor with some parts removed and further showing the trench in transverse vertical section;

Fig. 19 is a fragmentary view partly in side elevation and partly in transverse vertical section taken on the line 19—19 of Fig. 18;

Fig. 20 is a view partly in plan and partly in transverse horizontal section taken on the line 20—20 of Fig. 3, on an enlarged scale;

Fig. 21 is a view partly in front end elevation and partly in transverse vertical section taken on the line 21—21 of Fig. 20; and Fig. 22 is a fragmentary detail view partly in side elevation and partly in vertical section taken on the line 22—22 of Fig. 20.

In certain of the Figs. in the drawings, there is diagrammatically illustrated a trenching or excavating machine in the process of digging a trench A in which is being laid a pipe B. This trenching machine is indicated as an entirety by the numeral 25 with the exception of its boom 26 which is mounted for vertical swinging movement and carries an endless driven belt or chain 27 on which is mounted excavating buckets 28. This boom 26 is raised or lowered by a windlass drum 29 and a cable 30 which runs over guide sheaves 31 on the frame of the trenching machine 25 and the boom 26. Any suitable transmission mechanism, not shown, may be provided for operating the windlass drum 29. When the trenching machine 25 is in operation, the boom 26 is held in a downwardly and outwardly inclined position, as shown in Fig. 1, and the depth of the trench A, may be varied, at will, by changing the inclination of the boom to lower or raise the free or lower end thereof to cause the buckets 28 to dig to the desired depth.

While in the drawings there is illustrated a given type of trenching machine, it is of course understood that a steam shovel or any other suitable excavating method may be employed in digging the trench A.

The trench tractor includes a rectangular main frame comprising a pair of laterally spaced side members, each of which includes upper, lower and intermediate longitudinally extended channel bars 32 and front, rear and intermediate upright channel bars or columns 33. These two main frame side members are rigidly connected by crosstie members 34, see Fig. 11, certain of which connect the two bottom bars 32 at their lower flanges, and other of which connect the two front columns 33 together and the two rear columns 33 together. The flanges of the bars 32 are turned outward and the flanges of the columns 33 are turned inward with the webs of said bars 32 and columns 33 contacting and rigidly connected by rivets or otherwise.

The intermediate columns 33 are located close to the front columns 33 and which front columns extend slightly above the top bars 32 and are rigidly connected by a top crosstie member 35. The rear columns 33 extend materially above the top bars 32 and are rigidly connected by a top cross tie member 36. As best shown in Fig. 8, the bars 32 are extended rearward of the rear columns 33 and are progressively longer from the bottom up so that the rear end of the main frame is upwardly and rearwardly inclined. It is important to note that the top and bottom bars 33 are vertically and horizontally spaced from the intermediate bar 32 to afford therebetween upper and lower ways 37 which extend horizontally between the intermediate and rear columns 33.

The trench tractor is designed to travel on the bottom of the trench as the same is dug by the trenching machine 25 and, as shown, is mounted on a traction device in the form of an endless tread belt 38. This tread belt 38 is arranged to run on the bottom of the trench A and is made up of a multiplicity of hingedly connected tread links or plates arranged to run over driven rear sprocket wheels 39, idle front sprocket wheels 40, and intermediate idle wheels 41. The shafts for the wheels 39, 40 and 41 are journaled in a pair of longitudinally extended sills 42 on which the side members of the main frame rests and are rigidly secured.

The tread belt 38 is driven from an internal combustion engine mounted on the top of the main frame near the front end thereof and indicated as an entirety by the numeral 43 with the exception of a relatively small pulley 44 on the shaft of said engine. The driving connections from the engine 43 to the shaft of the driven sprocket wheels 39 include a belt 45 arranged to run over the pulley 44 and a relatively large pulley 46 on a countershaft 47 journaled in bearings on the rear columns 33 above the top bar 32, a spur pinion 48 on the countershaft 47 which meshes with a large gear 49 on a driven shaft 50 journaled in bearings on the rearwardly projecting ends of the top bars 32 and a sprocket chain 51 which runs over a relatively small sprocket wheel 52 on the driven shaft 50 and a relatively large sprocket wheel 53 on the shaft of the rear sprocket wheels 39.

The trench tractor further includes trench wall retaining devices which, as shown, are in the form of traction belts 54 arranged to contact with and travel longitudinally on the walls of the trench A and prevent the same from caving in, and at the same time afford auxiliary traction device which in the present arrangement of the trench tractor cooperates with the traction belt 38 in propelling the tractor. It is considered broadly new regardless of the character of the supporting and driving members of a trench tractor to provide the same with traction side belts. There is an upper pair and a lower pair of these traction belts 54, each of said pairs being mounted to travel in a horizontal plane. Normally the faces of each pair of belts 54 are substantially flush with the outer faces of the side members of the main frame for projecting movement into contact with opposite walls of the trench A by pressure devices as will presently appear.

Each belt 54 is mounted in a supplemental frame 55, which, in turn, is mounted in one of the ways 37 for horizontal sliding movement transversely of the main frame. The ways 37 hold the supplemental frame 55 against movement both vertically and longitudinally of the main frame. Each supplemental frame 55 comprises a pair of vertically spaced horizontal plates 56 which extend longitudinally in the respective way 37 and which plates are rigidly connected at their ends near their outer longitudinal edges by a pair of upright channel bars 57, the flanges of which are turned inward. Said pairs of plates 56 are also rigidly connected at their inner longitudinal edges by a pair of upright angle bars 58. These angle bars 58 further rigidly connect the upper and lower supplemental frames 54 on each side of the main frame. The two angle bars 58 connecting the upper and lower supplemental frames 55 on one side of the main frame have overlapping and interlocking engagement with the angle bars 58 connecting the upper and lower supplemental frames 55 on the other side of said main frame and thereby guide and reinforce the supplemental frames 55 on each side of the main frame. These overlapping and interlocking pairs of angle bars 58 also assist the columns 33 in holding the supplemental frames 55 against endwise movement longitudinally of the main frame and in respect to each other, but at the same time permit lateral movement of the connected supplemental frames 55 in respect to each other.

Each belt 54 comprises a plurality of hingedly connected plates or links set vertically endwise and mounted on a pair of driven rear sprocket wheels 59 and a pair of idle sprocket wheels 60. These pairs of sprocket wheels 59 and 60 cooperate with long upright internal teeth 61 on the backs of the belts 54 to guide and drive the same. The sprocket wheels 59 and 60 have hexagonal peripheries, in the corners of which are segmental seats arranged to receive the hinge joints between the links of the belts 54 and assist in driving and guiding said belts. To hold the belts 54 against vertical movement on the sprocket wheels 59 and 60 there is formed on said belts upper and lower endless sectional tracks 62 which travel in circumferentially extended grooves 63 in the peripheries of said wheels and supports the belts 54 from the sprocket wheels 59 and 60.

The belts 54 between the sprocket wheels 59 and 60 are held and guided for straight line travel by upper and lower idle wheels 64 which are mounted within said belts. The sectional tracks 62 travel between the idle wheels 64 of the upper and lower pairs for contact with the opposing faces thereof to support and guide said belts. Upper and lower pairs of internal lugs 65 on the belts 54 are arranged to engage the outer faces of the wheels 64 and further hold and guide said belts. By reference to Fig. 12 it will be noted that the idle wheels 64 and the lugs 65 are reversely beveled to direct said lugs onto the wheels during the travel of the belts 54.

In order to independently drive either the upper or lower pair of belts 54, said lower belts are made longer than the upper belts and extended rearward thereof, see Fig. 8. The two driven sprocket wheels 59 for the upper belts 54 are secured to vertical shafts 66 journaled on the upper supplemental frames 55, and the sprocket wheels 59 for the lower belts 54 are secured to vertical shafts 67 journaled on the lower supplemental frames 55. The idle sprocket wheels 60 are independently and loosely journaled on a pair of upright shafts 68 journaled in the upper and lower supplemental frames 55.

Steps of traveling movement are imparted to the belts 54 from the driven shaft 50 by ratchet wheels 69 on the upper ends of the shafts 66 and 67, and cooperating pawls 70 pivoted to a pawl reciprocating device in the form of a longitudinally extended horizontal bar 71. This bar 71 is mounted between pairs of front and rear guide rollers 72 journaled in bearings 73 on the upper bars 32 and held retracted by a coiled spring 74. This spring 74 is compressed between a spring seat 75, on the front end of the bar 71, and a spring seat 76 on an abutment 77 rigidly secured to a crosstie member 78 connecting the top bars 32. The pawls 70 are arranged in front and rear pairs with the former extending between the ratchet wheels 69 on the shafts 66 for cooperation therewith to rotate said shafts and impart steps of movement to the upper pair of belts 54. Said rear pair of pawls 70 extend between the ratchet wheels 69 on the shaft 67 for cooperation therewith to rotate said shafts and impart steps of movement to the lower pair of belts 54. The pawls 70 of each pair are outwardly and reversely extended and are yieldingly held in contact with the respective pair of ratchet wheels 69 by a coiled spring 79 compressed between said pawls and mounted in seats on the backs thereof, as best shown in Fig. 13.

To render either pair of pawls 70 inactive so that the respective belts 54 will remain idle, said pawls are provided with rear extensions 80 between which extends a cam head 81 secured to a short shaft 82 journaled in the bar 73 and an overlying bridge bar 83 secured thereto. On the upper end of the shaft 82 is a hand lever 84 by which said shaft may be operated to render the cam head 81 active or inactive. As shown in Fig. 13, there is a clearance between the pawl extensions 80 and cam heads 81 when the pawls 70 are active to permit free movement of said pawls over the teeth of the ratchet wheels 69. By giving the levers 84 a one-quarter turn, the cam heads 81 will be moved into engagement with the pawl extensions 80 and thereby move the pawls 70 of each pair toward each other against the tension of the springs 79 and out of contact with the teeth of the ratchet wheels 69.

To render any one of the pawls 70 inactive so that the respective belt 54 will remain idle, there is mounted in the reciprocating bar 71, at each pawl extension 80, a removable lock pin 85. These lock pins 85 are arranged to be placed back of the pawl extensions 80 to hold the pawls 70 inactive, as one thereof is indicated by broken lines in Fig. 13.

To operate the pawl carrier 71 and thereby cause the pawls 70 to impart steps of movement to the ratchet wheels 69, which, in turn, rotate the shafts 66 and 67 and operate the belts 54, as previously described, there is formed on each side of the gear 49 a plurality of circumferentially spaced peripheral cams 86 which engage a pair of cam rollers 87 on the rear end of the pawl carrier 71 and which rollers are yieldingly held by the coiled spring 74, in contact with said cams.

The belts 54 of each pair are yieldingly pressed against the walls of the trench A by a pair of coiled springs 88 for independent movement to produce the necessary traction to move the trench tractor and compensate for varying widths in the trench A, unevenness of the walls thereof and inwardly projecting stones, roots, or other objects in said walls. Each spring 88 is formed in two parts with the sections thereof held in cylindrical casings 89 secured to the backs of the supplemental frame bars 57 and against the inner faces of which bars the outer end of said spring sections engage.

An adjustable abutment 90 is interposed between the sections of each spring 88 and comprises right and left-hand screw rods 91 connected by a nut-acting member 92. The outer end portions of the screw rods 91 extend through apertures in the closed inner ends of the casings 89 from which the abutments 90 are supported. Said screw rods 91 are held from turning with the nut-acting members 92 by keys on the closed ends of the casing 89 and which keys extend into longitudinally extended key-ways in said rods to permit longitudinal movement of said rods. The screw rods 91 have on their inner ends spring caps 93 with which the inner ends of the sections of the springs 88 engage.

Normally, the springs 88 are at their free length so that there is no outward pressure on the belts 54. To adjust either one of the upper abutments 90 its nut-acting member 92 is provided with a collar 94 having a multiplicity of circumferentially spaced holes into which a bar may be inserted for turning said nut-acting member on the screw rods 91 to which it is applied.

To operate the lower pair of abutments 90, sprocket chains 95 run over sprocket wheels 96 on the upper nut-acting members 92 and sprocket wheels 97 on the underlying nut-acting members 92. If desired or found necessary, the two lower abutments 92 may be adjusted by operating the upper pair of nut-acting members 92 and then the chains 95 removed and the upper pair of nut-acting members 92 operated to adjust the two upper abutments 92.

It may be here stated, that there is sufficient clearance in the ways 37 for the belts 54 and supplemental frames 55 to permit free movements thereof transversely of its main frame or slight angular movements in respect thereto.

When the tractor is traveling from one job to another or in going into or out of the trench A, the abutments 90 are so adjusted as to permit the springs 80 to assume their free length with the belts 54 entirely within the main frame. After the tractor is in the trench A, the abutments 90 are adjusted to place the springs 88 under tension and press the belts 54 against the side walls of the trench A under the desired pressure. If desired, more tension may be placed on the springs 88 at the rear ends of the belts 54 so that said belts will more easily travel longitudinally on the side walls of the trench A, or greater pressure may be applied to either the upper or lower pair of belts 54 to better hold the side walls of the trench A.

To level or smooth the bottom of the trench A in advance of the trench tractor, there is provided a scraper blade 98 hinged to the lower end of a front plate or shield 99 and which scraper blade is held in an inclined operative position in front of said tractor by a pair of supporting rollers 100 on which said scraper blade rests, intermediate of its upper and lower edges. This scraper blade 98 extends the full width of the main frame and the shield 99 completely closes the front end of the main frame and is mounted in guide brackets 101 for raising and lowering movements. The supporting rollers 100 are journaled in the oblique front end portions of the lower bars 32 which are extended forward of the front columns 33.

To raise and lower the scraper blade 98 and hold the same in an operative position, as shown by full lines in Figs. 18 and 19, or in an operative position, as shown by broken lines in Fig. 19, there is provided an upright screw rod 102 having screw-threaded engagement with a bracket 103 on the back of the shield 99. This screw rod 102 is turnably mounted at its lower end in a step bearing 104 on the forwardly projecting ends of the lower bars 32 and its upper end is turnably mounted in a bearing 105 on the crosstie bar 35. A hand wheel 106 is journaled in the bearing 105 at the back of the shield 99 to turn about a horizontal axis and is connected, by a pair of intermeshing bevel gears 107, to the upper end of the screw rod 102.

Referring now in detail to the sheathing device, which is drawn in the trench A by the trench tractor, the same includes a pair of laterally spaced side members. Each of these side members comprises an upwardly and rearwardly inclined channel bar 108, upper, lower and intermediate longitudinally extended channel bars 109 and a side plate 110 rigidly secured to the outer faces of the webs of said bars 108 and 109. The two side members are rigidly connected by a plurality of crosstie bars 11 and upper and lower crosstie rods 112 and 113, respectively, and which rods extend through the webs of the bars 108. Said side members are further rigidly connected at the lower longitudinal edges of the side plates 110, by a shoe 114 on which the sheathing device moves on the bottom of the trench A. The lower rod 113 is extended outward of the side plates 110 to afford a pair of trunnions 115 journaled in bearings 116 in the webs of the rearwardly projecting ends of the lower bars 32, see Fig. 8, and connect the sheathing device to the trench tractor for movement therewith and with freedom for pivotal movement on said trunnions, whereby the sheathing device is free for movement in a vertical plane about the axis of said trunnions.

It is important to note that the trunnions 115 connect the sheathing device to the trench tractor only slightly above the tread traction belt 38 so that there is a direct pull by the trench tractor on the sheathing device, which keeps the same with its shoe 114 resting on the bottom of the trench A and overcomes any tendency thereof to work up in the trench A by its frictional contact with the side walls of said trench and out of contact with the bottom thereof.

The sheathing device is of substantially the same width and height as the trench tractor, and the crosstie bars 111 are so arranged as not to interfere with the workmen within said device. The shoe 114 also affords a platform on which the workmen may stand while working in the trench, and by reference to Fig. 16, it will be noted that said shoe terminates materially short of the rear end of the sheathing device so that a pipe or pipe sections may be laid or built within the sheathing device.

It will also be noted by Figs. 8 and 16, that the side plates 110, at the front of their lower longitudinal edges, and the front portion of the shoe 114 are upwardly and forwardly inclined so that the sheathing device may be turned on its trunnions 116 without coming in contact with the bottom of the trench A. This upwardly inclined front portion of the shoe 114 also causes the shoe to ride over the bottom of the trench during the travel of the sheathing device thereon.

To raise or lower the sheathing device by turning the same on its trunnion 115 and to hold the same raised with its shoe 114 above the ground so that the sheathing device may be easily carried by the trench tractor when moving from place to place, there is provided a cable 117, one end of which is attached to the crosstie rod 112 and its other end is arranged to be wound on a windlass drum 118 journaled on the rear columns 33 at the tops thereof.

For operating the windlass drum 118, there is secured to one end of its shaft a worm gear 119 which meshes with a worm 120, the shaft of which is journaled in bearings on the crosstie bar 36. A hand wheel 121 is applied to the inner end of the shaft of the worm 120 for rotating said worm and hence the windlass drum 118. Obviously, the worm gear 119 and worm 120 afford a lock to prevent rotation of the windlass drum 118 under the pulling action on the cable by the raised sheathing device.

Pairs of front and rear wheels 122 and 123, respectively, are provided to be removably applied to the trench tractor when out of the trench A to assist in transporting the same from place to place and to hold the same in an upright position and prevent tipping. Said pair of front wheels 122 are journaled on spindles 124 attached by steering knuckles 125 to stub axles 126. These axles 126 are square in cross-section and removably telescoped into the ends of a square box 127, as best shown in Figs. 20 and 21. This box 127 extends transversely of the main frame, rests on the top flange of its lower bars 32, and is rigidly secured thereto. The axles 126 are rigidly but detachably secured in the box 127 by nut-equipped bolts 128.

The two spindles 124 are connected for common steering movement by a pair of fixed arms 129 on said spindles and a crosstie rod 130, the ends of which are pivotally connected to said arms at their outer ends. Angular steering movement is imparted to one of the spindles 124 and hence the wheels 122 by a hand wheel 131 on the upper end of a steering post 132, the lower end of which is turnably mounted in upper and lower bearings 133 formed with the respective stub axle 126 and having a cam head 134 which works in a cam slot 135 in an extension on said spindle. A platform 136 is secured to the stub axle 126 having the bearings 133 and on which platform the operator stands when operating the steering wheel 131 to guide the trench tractor.

The rear wheels 123 are journaled directly on stub axles of the same type as those shown in Figs. 20 and 21, and which axles are removably mounted in a rear box 137 of the same type as the box 127 and secured to the main frame in the same manner. The stub axles for the rear wheels 123 may be rigidly but detachably secured in the box 137 by nut-equipped bolts, not shown.

The diameters of the front and rear wheels 122 and 123, respectively, are such that the front end of the trench tractor is supported on the front wheels 122 and the forward end portion of the tread traction belt 38 is lifted slightly from the ground and the rear end portion thereof is in contact with the ground to afford the necessary traction for moving the tractor.

The trench tractor may be made in various different widths and heights to travel in trenches of given widths and depths depending on the kind of service pipes to be laid therein. When it is necessary to dig a trench that is deeper than the height of the trench tractor and sheathing device, in order to secure the proper grade for the pipe being laid therein, supplemental trench wall-retaining members 137 and 138 are mounted on the tops of the side members of said tractor and sheathing device, respectively, to form extensions thereof. These supplemental members 137 and 138 are rigidly but detachably secured to the respective side members of the trench tractor and sheathing device by nut-equipped bolts 139, as shown in Fig. 7. Said two supplemental members 137 and the two supplemental members 138 are connected and held laterally spaced by cross-tie members 140, as shown in Fig. 6.

The operation of the trench tractor may be briefly described as follows:

The trenching machine 25, in digging the trench A, forms the ends of said trench on inclines so that the trench tractor may enter and leave said trench by its own power. The trench tractor is propelled from one job to the other and in the trench A on its tread belt 38 which is driven from the engine 43. As previously stated, the trench tractor is moved to a job with the front wheels 122 and rear wheels 123 attached thereto, as previously described.

Just before the trench tractor enters the trench A, on the inclined front end thereof, the front wheels 122 are removed and the windlass drum 118 operated to lower the rear end of the sheathing device and allow the same to be supported on the ground by its shoe 114. By relieving the trench tractor from the weight of the sheathing device thereon which tends to lift the front end of the trench tractor by the pull of its cable 117 on the upper ends of the rear columns 33, the front end of the trench tractor will more readily drop onto the inclined end of the trench A. After the trench tractor is on the inclined front end of the trench A, the rear wheels 123 are removed. To remove the front wheels 122 the front end of the tread belt 38 may be moved onto a block of wood or other obstruction to lift said wheels from the ground or holes may be dug under said wheels to release the same from the weight of the tractor.

The rear wheels 123 may be readily applied or removed from the trench tractor for the reason that they are usually out of contact with the ground.

Except when the trench tractor is operating in the trench A, the pawls 70 are held inactive by the cam heads 81 so that the belts 54 are idle. When the tractor is going into the trench A or out of the same, the idle belts 54 will engage the side walls of said trench and be moved thereby which materially reduces the friction between the tractor and side walls of the trench A so that said tractor will enter the trench with comparatively little effort.

After the trench tractor is in the trench A the springs 88 are placed under the desired tension to press the belts 54 against the walls of said trench and then the levers are operated to release the pawls 70, and permit the same to engage the ratchet wheel 69, under the reciprocatory movement of the pawl carrier 73, and impart relatively quick steps of movement to said belts to produce surface travel thereto at the same speed as that of the tread belt 38.

These belts 54, with the assistance of the main frame of the trench tractor, support the walls of the trench A as they are dug by the trenching device and prevent the same from caving in. Said belts 54 also perform another important function in that they afford auxiliary traction which materially assists the tread belt 38 in moving the tractor in the trench A and overcome any tendency thereof to work up on the side walls of the trench.

By manipulating the levers 84, the driving means for either the upper pair of lower pair of belts 54 may be cut out of action while the other is being operated, to facilitate the handling of the tractor. By the use of the stop pins 85, any one of the pawls 70 may be rendered inactive so that the driving means for the respective belt 54 will remain idle. It will thus be seen that either one of the upper or lower belts may be driven while the other thereof is not.

The sheathing device is of a width slightly less than that of the main frame of the tread tractor and with its front end extending between the oblique rear ends of the main frame side members so that said device will be drawn through the trench A by the tractor with comparatively little effort and by the direct pull thereon from the tractor will always remain on the bottom of the trench A. The termination of the shoe 114 considerably forward from the rear end of the sheathing device permits the laying of a pipe within the device so that the workmen and work are always fully protected by the sheathing device.

At the completion of the laying of the pipe B in the trench A and before the trench tractor is moved out of said trench, the windlass drum 118 is operated to lift the rear end of the sheathing device by means of the cable 117 and support the same entirely from the tractor. This lifting of the sheathing device by the cable 117 produces a rearward pull on the upper ends of the columns 33 which tends to lift the forward end of the trench tractor to cause the same to travel more easily up the inclined rear end of said trench. While the tractor is still on the inclined rear end of the trench A with its front end projecting above the surface of the ground, the front wheels 122 are applied thereto without the use of a jack, and after said tractor is entirely out of the trench A, the rear wheels are applied thereto.

What I claim is:

1. A trench tractor adapted to travel longitudinally on the bottom of a trench having trench side wall retaining devices capable of surface travel longitudinally on the side walls of the trench equal to that of the tractor.

2. The structure defined in claim 1 in further combination with power means carried by the tractor for driving said devices.

3. A trench tractor adapted to travel longitudinally on the bottom of a trench having a pair of trench side wall retaining endless belts capable of surface travel longitudinally on the side walls of a trench equal to that of the tractor.

4. A trench tractor adapted to travel longitudinally on the bottom of a trench having a pair of trench side wall retaining traction belts arranged to travel longitudinally on the side walls of the trench, and power means carried by the tractor for driving the belts.

5. A trench tractor adapted to travel longitudinally on the bottom of a trench having a pair of trench side wall retaining traction belts arranged to travel longitudinally on the side walls of the trench, and power means operative at will for driving either one or both of the belts.

6. A trench tractor having an upper pair and a lower pair of trench wall retaining traction belts, and power means for driving the belts.

7. A trench tractor having an upper and a lower pair of trench wall retaining belts, and power means for independently driving either the upper or lower pair of belts or both pairs of belts.

8. A trench tractor having an upper pair and a lower pair of trench wall retaining belts, and power means for independently driving both pairs of belts or either the upper or lower pair of belts or any one of the belts or both pairs.

9. A trench tractor, trench side wall retaining traction belts, power means for driving the belts, and yielding pressure devices for holding the belts against the side walls of a trench.

10. The structure defined in claim 9 in further combination with means for adjusting the pressure devices to render the same inactive.

11. A trench tractor, trench side wall retaining traction belts, power means for driving the belts, front and rear pressure devices for holding the belts against the side walls of a trench, and means for independently adjusting the pressure devices to vary the pressure on the belts or relieve the same from pressure.

12. A trench tractor, an upper pair and a lower pair of trench side wall retaining traction belts, means for driving either pair of said belts, and yielding pressure devices for independently holding the belts of either pair against the side walls of a trench.

13. A trench tractor having a main frame, a pair of supplemental frames mounted on the main frame for independent movement transversely thereof, a trench side wall retaining traction belt mounted on each supplemental frame, yielding pressure devices for holding the belts against the side walls of the trench, and power means for driving the belts.

14. A trench tractor having a main frame, an upper pair and a lower pair of supplemental frames mounted on the main frame, the supplemental frames of each pair having independent movement transversely of the main frame, a trench side wall retaining traction belt mounted in each supplemental frame, front and rear yielding pressure devices for holding the belts of each pair of supplemental frames against the side walls of a trench, and power means for independently driving the belts of each pair.

In testimony whereof I affix my signature.

GEORGE H. GREIMAN.